J. L. RITCHIE & G. L. YASTE.
COMBINED FILM BINDER AND PROTECTOR.
APPLICATION FILED NOV. 11, 1916.
1,229,139.
Patented June 5, 1917.
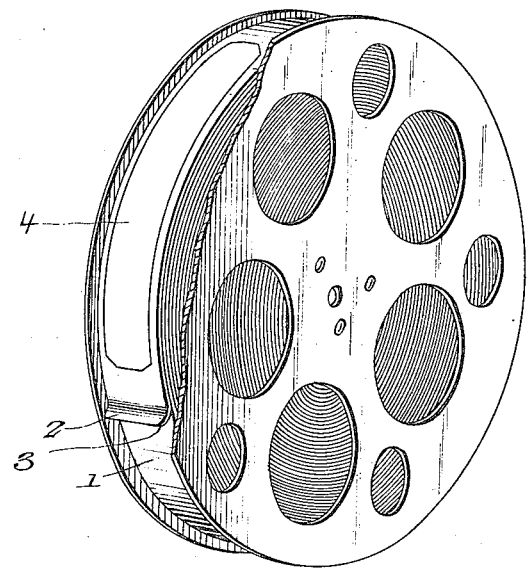
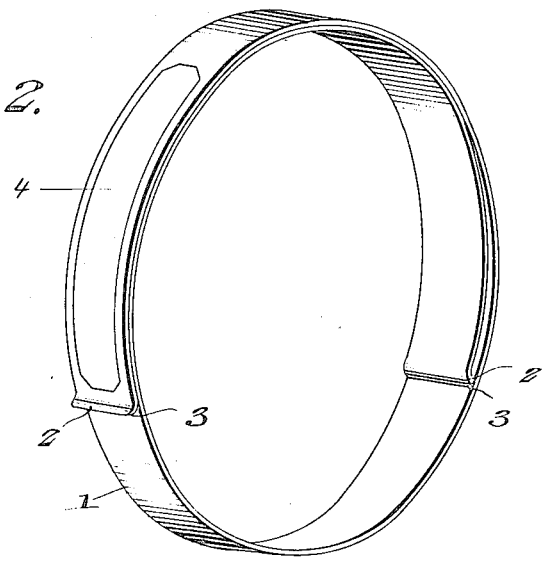

UNITED STATES PATENT OFFICE.

JOHN L. RITCHIE AND GEORGE L. YASTE, OF LONACONING, MARYLAND.

COMBINED FILM BINDER AND PROTECTOR.

1,229,139.　　　　　Specification of Letters Patent.　　Patented June 5, 1917.

Application filed November 11, 1916. Serial No. 130,929.

*To all whom it may concern:*

Be it known that we, JOHN L. RITCHIE and GEORGE L. YASTE, citizens of the United States, residing at Lonaconing, in the county of Allegany and State of Maryland, have invented new and useful Improvements in Combined Film Binders and Protectors, of which the following is a specification.
This invention relates to a combined binder and protector for moving picture films.

The object of the invention is to provide means for preventing the unwinding of the film from the reel when not in use, and to effectually cover the exposed face of the film in order to protect it from being mutilated or destroyed.

With the above and other objects in view the invention consists of a strip of flat spring metal formed into the shape of a band and provided with outwardly turned rounded overlapping ends, the said band being of a sufficient length and width to entirely cover the face of the film when in position upon the reel.

In the drawings;

Figure 1 represents a perspective view of a reel having a film wound thereon and the improved binder and protector in position, a portion of the said reel being broken away to show part of the film beneath;

Fig. 2 is a perspective view of the binder and protector detached.

Heretofore it has been the usual custom to use rubber bands as binders for moving picture films when they are not in use, for the purpose of preventing them from being accidentally unwound. This method causes much trouble and delay in putting on the reel, as the band commonly used frequently slides down between the reel and the film in such position as to make it difficult of removal, it being impossible to unwind the film with the rubber band in this position owing to the liability of damaging the film. The rubber band frequently slides down and off the film allowing it to unroll and injuring many valuable films. There is sometimes employed a paper binder secured around the film by means of a string or rubber band. This method is open to the criticism of the one previously described.

In order to overcome the difficulty set forth and to provide means for protecting the film from fire or other destroying or mutilating means, there is provided the following described invention. In the practical form of the invention there is employed a strip of flat spring metal 1 bent into the form of a band, the spring-like qualities of the metal having a tendency to force the overlapping ends of the band together to reduce the diameter thereof. By this means there is provided a band which is automatically adjustable to rolls of film of various diameters. The band is formed of thin metal and is of a width substantially the same as the film, so that when it is adjusted in position upon a roll of film it will cover the entire face of the said roll. The ends of the band are outwardly turned as at 2, the said ends being rounded as shown at 3 to eliminate any sharp corners which might injure the face of the film. The outwardly turned portions 2 provide a smooth and convenient end to aid in adjusting the band in position.

From the foregoing description when taken in connection with the accompanying drawings it will be seen that the invention provides a binder and protector that will entirely cover the face of the film roll and will hold the same tight so that it will be almost impossible for fire to reach it. It is also susceptible of quick and easy adjustment and may be repeatedly used on different films.

If desired the band may be provided with a suitable tag 4 by means of which the nature of the picture may be indicated. This tag may be applied in any suitable manner and if desired may be formed with the surface of a nature to enable the indications thereon to be removed and others substituted when the binder is applied to a different film.

Having described the invention, what we claim is:

The combination with a reel for moving picture films, of a single strip of flat spring metal shaped to form a closed band and having overlapping ends, said band being of substantially the same width as the space between the walls of the reel to form an adjustable outer protecting wall for the film and outwardly turned ends for said band.

In testimony whereof we affix our signatures.

JOHN L. RITCHIE.
GEORGE L. YASTE.